E. PHELPS.
GEARING FOR SUGAR CANE MILLS.
No. 7,059.  Patented Jan. 29, 1850.
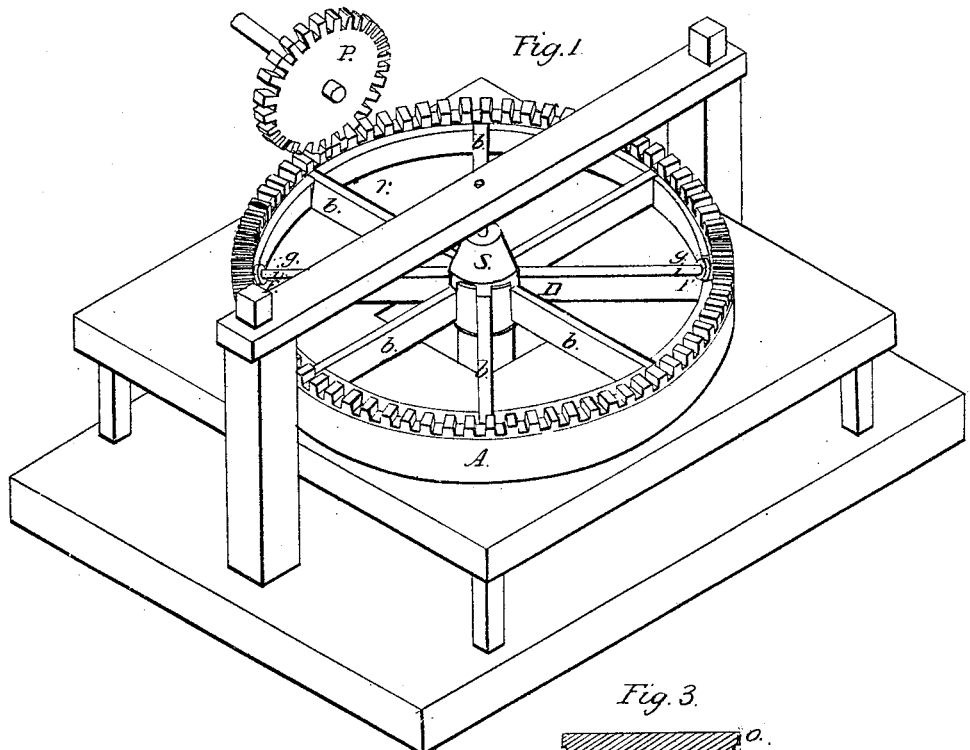
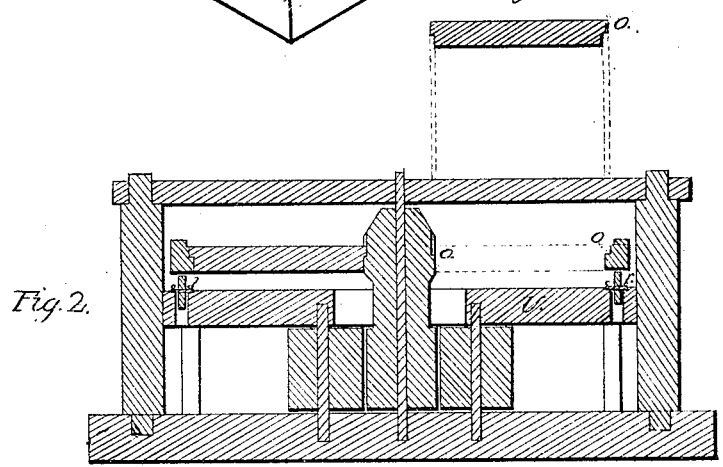

UNITED STATES PATENT OFFICE.

EDWARD PHELPS, OF PITTSBURG, PENNSYLVANIA.

IMPROVEMENT IN GEARING FOR SUGAR-CANE MILLS.

Specification forming part of Letters Patent No. 7,059, dated January 29, 1850.

*To all whom it may concern:*

Be it known that I, EDWARD PHELPS, of Pittsburg, county of Allegheny, and State of Pennsylvania, have invented a new and useful Improvement in Sugar-Cane Mill Gearing; and I do hereby declare that the following is a full, clear, and exact description thereof, reference being had to the accompanying drawings, in which—

Figure 1 is a perspective view, and Fig. 2 a vertical section through the center of the machine and Fig. 3.

The main purposes of my invention are to prevent the loading of the pivot of my main vertical roller-shaft with the weight of the heavy cog-wheel which drives it, while I secure a true horizontal motion of the wheel itself, and to allow for the vibratory motions of the said roller-shaft consequent on the irregularities of strain brought upon the rolls by the variable nature of the work which they have to perform.

As sugar-mills are ordinarily constructed on plantations, it is often impracticable to insure that accuracy of workmanship which can completely obviate irregularities of movement in the main shaft; and when it is sought to secure this object by increasing the size and weight of materials the load on the bearing-pivots is liable to cause much friction and heating. To obviate these evils and obtain all necessary strength and steadiness of action both of the wheel and its driving-pinion, the following arrangement and construction of parts have been adopted in my improved gearing. A large and strong face cog-wheel, A, rests near its periphery upon a series of friction-rollers or wheels, *r r*, Fig. 2, placed on a horizontal support, U, the cogs being placed on the upper face of the wheel, to be acted on by a pinion, P, from the driving-power, placed immediately above one of the friction-rollers. The wheel A is connected with its vertical shaft S in the following manner: Through this shaft, and on a level with the rim of the wheel, passes the fixed cross-arm D, extending out on both sides of S so far as nearly to touch the inner periphery of A, where at each extremity F F it enters a vertical groove, *g g*. These grooves are formed by flanges projecting inward toward the shaft. On each end of the arm D is placed a vertical friction-roller, *i*, applying its periphery to the vertical flanges, and thereby preventing the pressure of the arm and the friction thence arising from communicating any vibrations of the shaft S and of the arm D to the wheel A, tending to lift it from the friction-rollers below it. The ends of the arm D never touch the bottoms of the groove in which they respectively run, and hence no friction-roller is required in that direction. They are prevented from such contact by the braces *b b b b*, which merely rest in grooves or form loose joints between the rim and the shaft of the wheel, preserving a uniform distance all round between the shaft and the rim of the wheel A, but causing no part of the weight of the rim to rest on the shaft. These braces keep the rim in a true circular form, while allowing it to oscillate slightly in a horizontal direction to conform to the vibrations of the shaft. At *o o*, Fig. 2, one of the braces is represented as removed, and its form is exhibited in Fig. 3.

I do not lay claim to the general arrangement by which a heavy horizontal wheel is made to traverse on friction-rollers. This, I am aware, has often been done when such wheel was fixed to its vertical axis by permanent arms, especially for the purpose of enabling the wheel to support heavy weights, as in the common turn-tables of railroad-stations. But in such cases there is no strain or vibration primarily given to the vertical shaft, as is the case of the cane-mill having one of its rolls on the vertical shaft, which is to be driven by the heavy face-wheel; but What I do claim as my invention, and desire to secure by Letters Patent, is—

The wheel A, revolving horizontally, in combination with the jointed or loose braces *b b b b*, connecting but not fastening it to the shaft S, and with the fixed arm D, the vertical grooves *g g*, and the friction-rollers *i i*, acting together substantially in the manner and for the purposes herein set forth, not limiting myself in this claim to the exact number and arrangement of the several parts herein described, but varying the same at pleasure, while I attain the same ends by means substantially the same.

EDWARD PHELPS.

Witnesses:
WALTER R. JOHNSON,
A. STEINWEHR.